United States Patent [19]

Haines et al.

[11] Patent Number: 4,832,445

[45] Date of Patent: May 23, 1989

[54] SECURITY DIFFRACTION DEVICES DIFFICULT TO EXACTLY DUPLICATE

[75] Inventors: Kenneth A. Haines, Ossining; Robert H. Weller, Briarcliff Manor, both of N.Y.

[73] Assignee: American Bank Note Holographics, Inc., Elmsford, N.Y.

[21] Appl. No.: 864,193

[22] Filed: May 16, 1986

[51] Int. Cl.$^4$ .......................... G02B 5/18; G03H 1/20
[52] U.S. Cl. .................... 350/162.2; 283/86; 283/91; 283/904; 350/3.69; 350/162.19
[58] Field of Search ............... 350/162.19, 162.2, 3.69; 283/88, 91, 902, 904, 86

[56] References Cited

U.S. PATENT DOCUMENTS

| | | |
|---|---|---|
| 3,633,989 | 1/1972 | Benton. |
| 3,957,354 | 5/1976 | Knop. |
| 4,129,382 | 12/1978 | Greenaway. |
| 4,304,809 | 12/1981 | Moraw et al. |
| 4,417,784 | 11/1983 | Knop et al. ............... 283/91 |
| 4,484,797 | 11/1984 | Knop et al. ............... 350/162.19 |
| 4,568,141 | 2/1986 | Antes ............... 283/91 |
| 4,576,439 | 3/1986 | Gale et al. ............... 350/162.2 |

FOREIGN PATENT DOCUMENTS

| | | |
|---|---|---|
| 0012375 | 12/1979 | Fed. Rep. of Germany. |
| 0105099 | 7/1983 | Fed. Rep. of Germany. |
| 2116908 | 3/1982 | United Kingdom. |
| 2093404 | 9/1982 | United Kingdom. |

OTHER PUBLICATIONS

"Optical Holography", P. Hariharan, 1984, pp. 1-3, 120-124, Cambridge University Press, London.
"Fabrication of High Efficiency Surface Relief Holograms", *Journal of Imaging Technology*, vol. 10, No. 3, Jun. 1984, pp. 105-108, H. Werlich et al.
"The Use of Photoresist as a Holographic Recording Medium", Beesley et al., Applied Optics, vol. 9, No. 12, Dec. 1970, pp. 2720-2724.
Gale, "Sinusoidal Relief Gratings for Zero-Order Reconstruction of Black-and-White Images", *Optics Communications*, vol. 18, No. 3, Aug. 1976, pp. 292-297.
Knop, "Color Pictures Using the Zero Diffraction Order of Phase Grating Structures", *Optics Communications*, vol. 18, No. 3, Aug. 1975, pp. 298-303.
Gale and Knop, "Color-Encoded Focused Image Holograms", *Applied Optics*, vol. 15, No. 9, Sep. 1976, pp. 2189-2198.
Leith, "White-Light Holograms", *Scientific American*, vol. 235, No. 4, Oct. 1976, pp. 80-95.
Benton et al., "One-Step White-Light Transmission Holography", *SPIE*, vol. 212, 1979, pp. 2-7.
H. J. Caulfield, Ed., *Handbook of Holography*, 1979, pp. 97-101, 420-423, 438-441, (Collection of Gau 257).
R. Harrington, *Time Harmonic Electromagnetic Fields*, 1961, pp. 460-464, (Collection of Gau 257).
"Bessel Functions $J_0(x)$ and $J_1(x)$", Handbook of Chemistry and Physics, p. A-188, (Collection of Gau 257).

*Primary Examiner*—Bruce Y. Arnold
*Assistant Examiner*—Martin Lerner
*Attorney, Agent, or Firm*—Majestic, Parsons, Siebert & Hsue

[57] ABSTRACT

Holograms, including diffraction gratings, and methods of making them, that reconstruct an image which changes as the hologram is tilted with respect to the viewer and in a manner that images reconstructed from copies made of the hologram in monochromatic light do not have that motion. The hologram is a valuable security device for authenticating documents or objects to which it is attached since it is extremely difficult to duplicate.

31 Claims, 4 Drawing Sheets

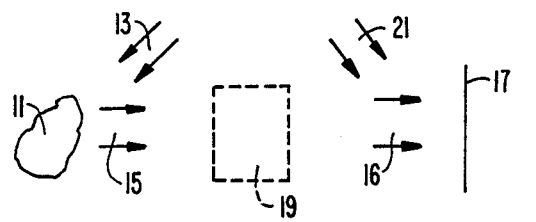
FIG._1.
PRIOR ART
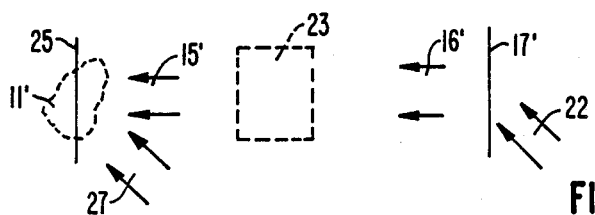
FIG._2.
PRIOR ART
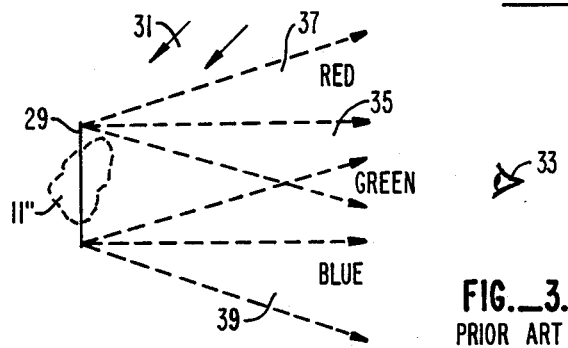
FIG._3.
PRIOR ART
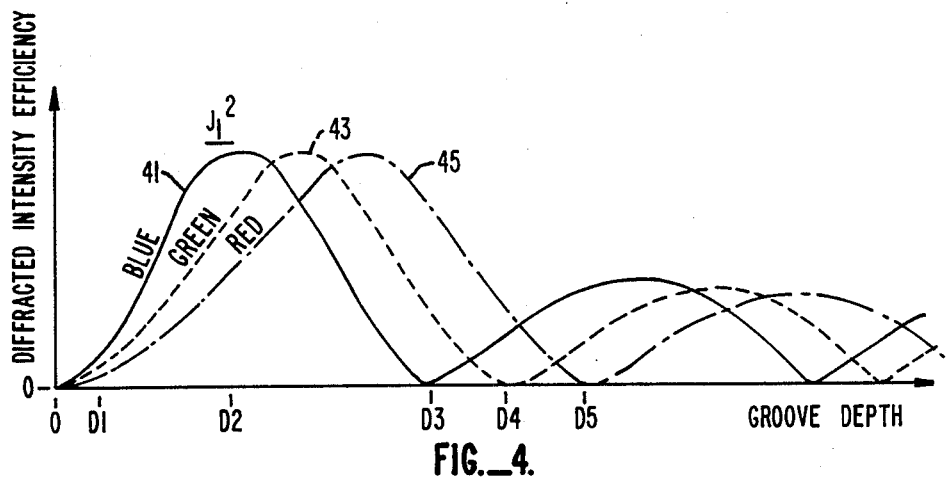
FIG._4.

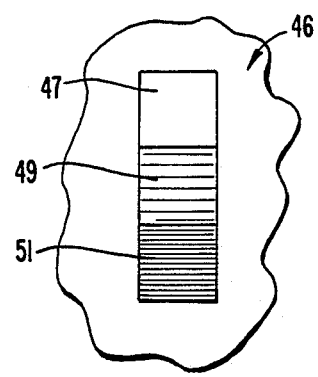
FIG._5.
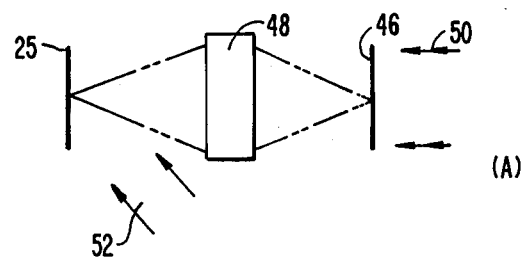
(A)
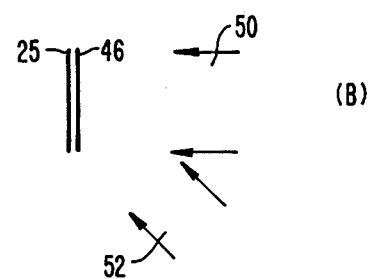
(B)
FIG._6.

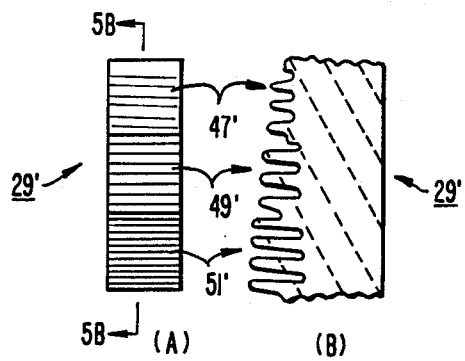
FIG._7.
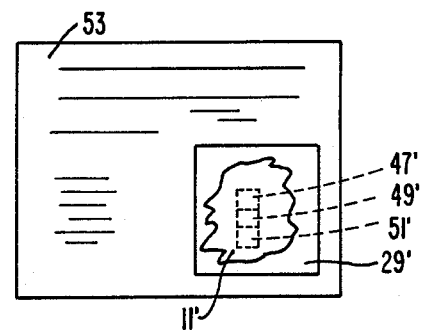
FIG._8.
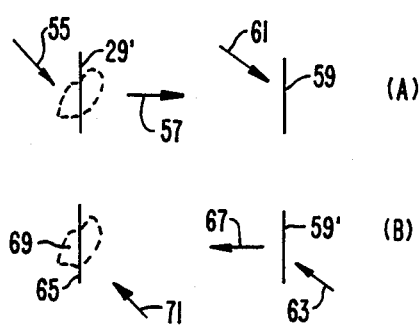
FIG._9.
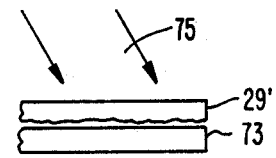
FIG._10.
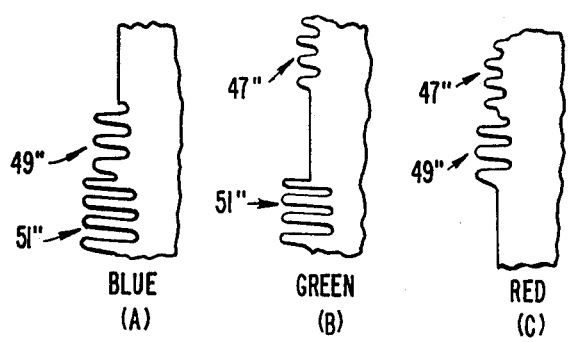
BLUE (A)   GREEN (B)   RED (C)
FIG._11.

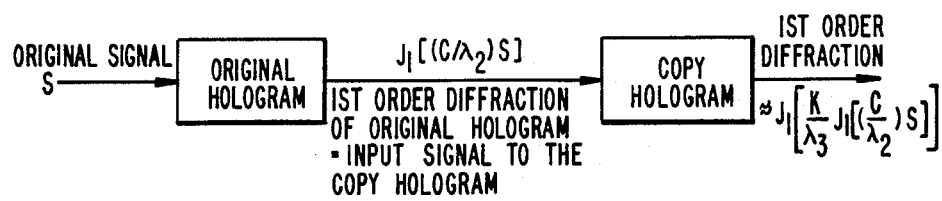
FIG._12.
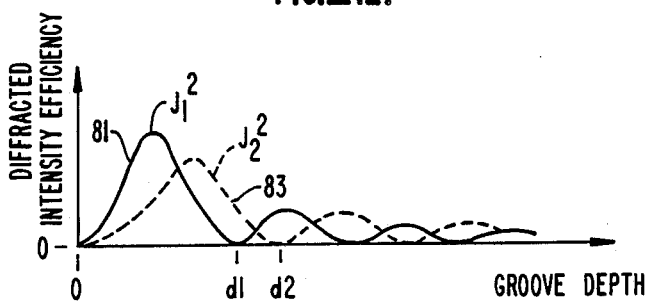
FIG._13.
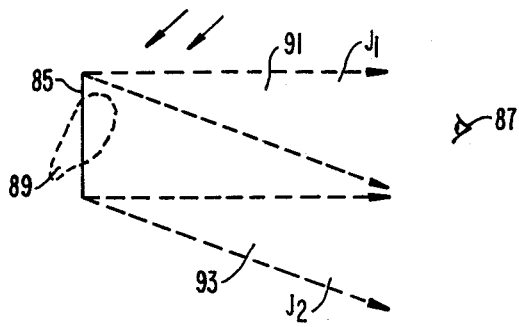
FIG._14.

SECURITY DIFFRACTION DEVICES DIFFICULT TO EXACTLY DUPLICATE

BACKGROUND OF THE INVENTION

This invention relates generally to diffraction gratings and holograms, especially those designed for use as security devices to authenticate documents or objects to which they are attached.

Holograms are becoming widely used on credit cards as security devices to authenticate genuine cards. Similar use of holograms is being made, or proposed to be made, in authenticating certificates of various kinds, as seals for containers to restrict unauthorized entry, and similar applications. Currently, such holograms are embossed onto thin plastic with a reflective layer added, the embossing hologram originally being made in an optical laboratory with laser equipment. The plastic replicated holograms are made of very thin material and attached to the credit card, or other device being authenticated, in a manner that an attempted removal of the hologram destroys it. This reduces the likelihood that holograms for counterfeit documents can be removed from other expired or unused cards or documents.

Holograms which reconstruct images of objects are a preferred form of diffraction grating for security applications because they are harder to make. The specialized skills and extensive equipment that is required to make a hologram create a significant barrier for counterfeiters who attempt to make original holograms from an object scene that resembles that of the security hologram to be simulated.

Effort has been directed to making security holograms in which the object scene is chosen such that any copies that might be made by counterfeiters will not look exactly like the original. However, it is difficult to make such a security hologram from which a copy of it can readily be distinguished by the usual observer from the original. Therefore, it is a primary object of the present invention to provide a diffraction grating and hologram, and methods of making them, from which unauthorized copies thereof are more readily apparent.

SUMMARY OF THE INVENTION

This and additional objects are accomplished by the various aspects of the present invention, wherein, briefly, a diffraction grating, or hologram, is made in a way that an image reconstructed from a copy is significantly different from that reconstructed from the original, so copies can esily be detected. One technique in making the original security grating, or hologram, according to the present invention is to do so in a manner that the image changes when the hologram, which is illuminated in polychromatic light, is tilted with respect to the viewer and thus viewed in the different colors of diffracted light. This security hologram is also made so that copies from it do not show this changing image. For example, the original grating or hologram can be made so that at least one dark region moves across the diffracted light pattern or image as the grating or hologram is tilted. A copy made in monochromatic light will, when reconstructed in white light, show a fixed dark spot as the grating or hologram is tilted, rather than a moving one, thereby being easily detectable as a counterfeit.

A way of constructing such a security hlogram, according to the present invention, is to take advantage of the fact that the diffraction intensity characteristics of a grating or hologram are not a linear function of the light intensity pattern recorded on it. The prevalent current approach is to operate on a linear enough portion of such a characteristic curve that reconstructed image degradations are kept within desired limits. But the technique of the present invention intentionally operates on non-linear portions of a grating or hologram characteristic curve so that an image wavefront reconstructed from the copy is much different than that reconstructed from the grating or hologram being copied for all but a narrow range of reconstruction wavelengths.

Additional objects, advantages and features of the various aspects of the present invention will become apparent from the following description of its preferred embodiments, which description should be taken in conjunction with the accompanying drawings.

BRIEF DESCRIPTION OF THE DRAWINGS

FIGS. 1 and 2 show, as background, general existing techniques for making a master optical hologram;

FIG. 3 illustrates the viewing characteristics of a typical existing type of hologram that is replicated from that made according to the method shown in FIGS. 1 and 2;

FIG. 4 illustrates characteristic curves of a diffraction grating or hologram;

FIGS. 5 and 6 show an example of making a diffraction pattern using characteristics illustrated in the curves of FIG. 4;

FIG. 7 shows an example of a diffraction pattern that was made according to the method of FIGS. 5 and 6;

FIG. 8 illustrates one use of such a diffraction pattern;

FIGS. 9 and 10 show two typical methods that counterfeiters might use for copying a hologram from a credit card and the like;

FIG. 11 shows the diffraction pattern of FIG. 7 that is obtained on such a copy;

FIG. 12 illustrates schematically the effect of the diffraction characteristics of an original and copy hologram;

FIG. 13 shows additional characteristic curves of a diffraction grating or hologram; and FIG. 14 illustrates the reconstruction of an image from a hologram made according to yet another aspect of the present invention.

DESCRIPTION OF THE PREFERRED EMBODIMENTS

The embodiment described herein is a surface relief hologram. In this description, a diffraction grating is considered to be a special case of a hologram. Both are formed by interfering two coherent light beams at a photosensitive surface. The result in both is a surface that diffracts light into one or more diffracted orders of varying colors when viewed in white light. The difference for a hologram is that, during its construction, one of the coherent beams used to make it can either pass through, or be reflected from, an object scene before striking the photosensitive surface. Such a hologram thus forms in its diffracted beams an image of that object scene. A diffraction grating is made from a controlled wavefront, such as a plane wave, so does not reconstruct an image of a complex object. What is viewed in a diffracted beam from a diffraction grating is either a uniform wavefront or a simply varying one.

Although specific diffraction grating security techniques are described herein with respect to the figures, it will be understood that the more complex holographic techniques are also within the scope of this application.

Referring initially to FIGS. 1-3, well-known holographic techniques, and the resulting holograms, will be generally described as background. If a hologram is desired to be made of a three-dimensional diffusely reflecting object 11, for example, that object is illuminated by coherent radiation 13, usually obtained from a laser. Light reflected from the object 11 in an object beam 15 may be passed directly onto a photosensitive hologram detector 17, or, more generally, is passed through an optical system 19 beforehand, and then onto the detector 17 as object beam 16. In either case, a reference beam 21, coherent with the object illuminating beam 13, is directed against the hologram detector 17 at a finite angle with the object information carrying beam 16. The reference beam 21 is usually unmodulated.

For a simple holographic grating, neither the object wave 11 nor the optical system 19 need be used. Instead, an unmodulated plane wave is used in place of object wave 16.

The hologram detector 17 is then processed to record a diffraction pattern formed thereat by interference of the beams 16 and 21. This forms hologram 17' that is, in a second step illustrated in FIG. 2, illuminated by reconstructing coherent radiation 22 in order to produce a replica 16' of the recorded object image carrying beam 16. This replicated wavefront 16' may, optionally, pass through an appropriate optical system to create the information carrying beam 15' on a second hologram detector 25 that is positioned therein at the location of a reconstructed real image 11' of the original object 11. The wavefront 15' is captured on the detector 25 by directing a reference beam 27, that is coherent with the hologram illuminating beam 22, against the holographic detector 25 at a finite angle with the beam 15'.

FIGS. 1 and 2 show a rather generic, two-step hologram making process. The hologram resulting from appropriate processing of detector 25 is capable of reconstructing an image adjacent the surface of the hologram itself. This is termed a "focused image" hologram and is the type that is most commonly made for replicated holograms, including those used on credit cards and the like. Alternatively, an image may be focused into the hologram detector 17 by appropriate optics within the optical system 19, in order to make a hologram according to the single step of FIG. 1 without having to make the second hologram of FIG. 2. But the two-step process shown in FIGS. 1 and 2 is preferred for quality and a large field of view.

The hologram detector 25 is most commonly made of a photoresist material such that the interference pattern formed thereacross by interference between the beams 15' and 27 is converted into a surface relief pattern that refracts incident light into its various orders, although it is optically clear thereacross. However, this is referred to herein as "diffraction," as is commonly used in the holographic arts. The first hologram 17 is often made from high resolution silver halide photographic film, in a linear region, in order to form a high quality intensity hologram.

The surface relief hologram has many advantages for inexpensive replication since a metal master (not shown) can be made from it, and that metal master is then used to emboss thin plastic foil with the surface relief pattern. These embossed replicas are usually coated with a thin film of reflective material so that a replica of the recorded wavefront is reconstructed therefrom in reflected lght.

Referring to FIG. 3, such a hologram replica 29 is illustrated, from which an image 11" is reconstructed therefrom when illuminated by white (multicolored, non-coherent) light 31. An observer 33 sees the best image when looking in a first order diffracted beam. A single such first order diffracted beam is shown in FIG. 3, with a separation of colors that exists. The observer 33 is shown to be positioned to view the image 11" in a green portion 35 of the first order diffracted beam. By tilting the hologram about an axis perpendicular to the paper, the observer 33 can view the image in other colors, such as in a red portion 37 of the diffracted beam, or, if tilted in an opposite direction, in a blue portion 39. The color spectrum is generally continuous, but only three color components are being described for simplicity.

The hologram 29 is viewable in non-coherent, white light because its image is reconstructed near the surface of the hologram and because of optical elements used in the known optical system 19 and/or 23 of the master making process shown in FIGS. 1 and 2. The most commonly used systems 19 and 23 also are designed to limit the bandwidth of the object wavefront recorded on the master hologram 25 by discarding vertical parallax and retaining horizontal parallax.

The curves of FIG. 4 illustrate the known diffraction efficiency characteristics of a simple sinusoidal grating which results with the construction of a hologram whose object is a plane wave. The making of a simple security grating that takes advantage of these characteristics is illustrated in FIGS. 5 and 6. An opaque mask 46 contains three adjacent transparent regions 47, 49 and 51. The region 47 is optically clear, the region 49 somewhat gray and the region 51 more gray. These regions are illuminated by a plane wave coherent beam 50, in FIG. 6(A), and imaged by a lens system 48 onto the hologram detector 25. The use of a planar off-axis reference beam 52, coherent with the beam 50, forms the desired diffraction pattern.

As a variation of the technique of FIG. 6(A), the mask 46 may be positioned immediately adjacent the detector 25 and both the interfering coherent wavefronts 50 and 52 passed through its regions 47, 49 and 51, as shown in FIG. 6(B). In either case, the diffraction pattern so formed may be replicated as a surface relief pattern to form a replica 29, as described above.

On a horizontal axis of FIG. 4, which is specifically related to surface relief hologram gratings, is the depth of the groove of the grating, beginning at the left with zero depth (smooth surface). The vertical axis indicates the percentage of light striking the grating that is diffracted into a single first order diffracted beam. As is well known, some of the incident light is diffracted into other orders or is reflected as a zero-order beam. Also, as is well known, the curves of FIG. 4 are Bessel functions, given the usual mathematical notation $J_1^2$. When white (multicolored) light strikes such a simple grating, it is diffracted into rays which are oriented according to the colors just as is illustrated in FIG. 3 for the generalized hologram.

FIG. 4 illustrates exemplary characteristics of a portion of the replica 29 containing a grating made according to either FIGS. 6 (A) or (B), in the separate colors chosen for illustration in FIG. 3. A curve 41 shows the intensity characteristics of the blue portion 39 of the diffracted beam. Similarly, a curve 43 shows that characteristic for the green portion 35 of the diffracted order, and curve 45 for the red portion 37.

The groove depth of the resulting diffraction pattern is controlled primarily by two factors. One factor is the intensity of the light that is recorded on the master hologram 25, and the other factor is the post-exposure processing. For a general hologram, the first hologram 17 made in the existing process illustrated in FIGS. 1 and 2, is held on a very linear portion its characteristic curve. When the second hologram 25 is made, the groove depth is usually increased in order to improve the amount of light that is diffracted into an image carrying first order beam. It is not unusual for groove depths to be selected for the diffraction efficiency to extend to near the peak of the curves, such as indicated at D2 for the blue curve 41. Some distortion is encountered when operating in the region that includes slightly non-linear portions, but this does not significantly degrade the quality of most focused image holograms. Gratings are generally made with groove depths at the peak of such curves in order to maximize the amount of incident light that is diffracted into a first order beam. With diffraction gratings, of course, there is not the concern for image distortion.

A principal aspect of the present invention is the intentional making of holograms that operate well beyond the first path of its characteristic Bessel function curve for a first order diffracted beam. The extremely non-linear, low, and even zero, diffraction intensity efficiency characteristics to the right of these peaks in the curves of FIG. 4, avoided by traditional techniques, are intentionally utilized in order to make a hologram that cannot be exactly replicated.

As a specific example of the inventive technique, consider a part of a hologram 29 of FIG. 7 having three adjacent grating regions 47', 49' and 51' that have been made by one of the techniques of FIG. 6. In this illustrative example, the area 47' is constructed to have a groove depth substantially that indicated at D3 in FIG. 4. As can be seen, the amount of light diffracted from that area into a blue component 39 of the first order diffracted beam is zero, while there is some intensity in other colors. Similarly, the adjacent area 49' is made to have a groove depth substantially equal to D4 indicated on FIG. 4, thus having no light diffracted in the green portion 35. Lastly, for this illustration, the region 51' is made to have a depth substantially equal to D5 of FIG. 4, thereby having substantially no intensity diffracted into the red component 37 of the image carrying beam of FIG. 3, while having some intensity that is viewable in the other color components 35 and 39. The effect is thus that as a hologram 29 is rotated with respect to the observer 23 about a horizontal axis (perpendicular to the surface of FIG. 3), a black spot appears to move across the portion of the image containing areas 47', 49' and 51' as the diffraction beam sweeps through the colors.

FIG. 8 illustrates generally the use of such a hologram 29, attached to a carrier 53. The carrier 53 can be a credit card, for example, or a passport, identification card, driver's license, stock certificate, and the like. The purpose of the hologram 29 is to authenticate the carrier 53 and any information carried on it. By rotation of the carrier 53 above the horizontal axis, a black spot appears to move across the hologram portions 47', 49' and 51', a part of a larger image 11".

The reason that the non-conventional hologram 29 is useful is that a copy made in monochromatic light from it will not reproduce the moving spot. Therefore, copies can be readily identified. This is explained with respect to FIGS. 9–11. FIG. 9 shows a one typical way of copying a replicated hologram. The hologram 29 is illuminated by a coherent light beam 55 to form a diffracted beam 57 that is captured on an intermediate holographic detector 59 by use of an off-axis reference beam 61. Processed hologram 59' is then played back by a coherent reconstruction beam 63 to record on another hologram detector 65 a first order diffracted beam 67. The detector 65 is positioned to coincide with the image 69 reconstructed in the first order beam 67 so that it will be a replica of the focused image hologram 29. That image is recorded by a coherent, off-axis reference beam 71.

The known copying technique of FIG. 9 is generally preferred since only a single diffracted order of light is captured on the hologram detector 59 of FIG. 9(A) and 65 of FIG. 9(B). A different technique, termed contact copying, is illustrated in FIG. 10 and is somewhat simpler. The hologram 29 is placed immediately adjacent to a holographic copy detector 73. A coherent light beam 75 is then passed through the hologram 29. All of the orders diffracted by the hologram 29 are thus captured on the detector 73, along with the zero diffracted order (that is, the undiffracted portion of the light beam 75 passes directly through the hologram 29). All of these diffracted orders interfere among themselves to create extra and unwanted image terms. Also, the zero order beam, which serves as the reference, is not of uniform intensity across it by the time it strikes the detector 73. Therefore, images reconstructed from a contact copy are generally of poorer quality than those made of the technique of FIG. 9.

It will be recognized that both FIGS. 9 and 10 assume that the hologram 29 allows reconstructing light to pass through it. With a metallized, plastic embossed hologram of the type now used for security applications, this first requires neutralization or removal of the reflective coating. However, the techniques of FIGS. 9 and 10 can be used to make a copy from reflective holograms as well.

This discussion of copying is included herein for the purpose of illustrating the additional security features of the hologram 29. This is best illustrated by reference to FIG. 11 wherein a cross-section of a copy hologram at the portions of the image corresponding to areas 47', 49' and 51' of the original hologram are illustrated as 47''', 49''' and 51'''. FIG. 11(A) shows such a replica made in blue coherent light. Only monochromatic light can be used in making copies of the hologram if undesirable distortion or blurring is to be prevented. The result of using this standard copy technique on the hologram 29 in blue light means that the region 47' of the hologram 29 that had zero diffraction intensity efficiency in blue light is not recorded at all. The copy hologram detector simply receives no light in the object beam from the region 47', and so the replica illustrated in FIG. 11(A) is smooth in the corresponding area. Similarly, FIG. 11(B) shows a replica made with green monochromatic light, and FIG. 11(C) a replica in red. In any of these cases, a portion of the information on the original hologram is not copied, so the reconstructed image will not be the same. In this specific example, the spot will not move as a hologram is tilted about a horizontal axis.

FIG. 12 shows in a different, more general way, why the image reconstructed from the copy hologram will be different from that originally recorded on the original hologram. Each of the original and copied holograms are indicated by a box in FIG. 12 with a given input/output transfer function. The original optical signal "s" is recorded on the original hologram. The first order diffracted signal reconstructed from it is, $$J[(C/\lambda_2)s],$$

which is then recorded on the copy hologram, where "C" is a constant, and $\lambda_2$ is the copy wavelength. The first order signal reconstructed at wavelength $\lambda_3$ from the copy, is, $$J_1[(k/\lambda_3)J_1[(C/\lambda_2)s]],$$

where "k" is a constant. As the reconstruction wavelength $\lambda_3$ of the copy hologram is varied, the amplitude of the first order diffracted light varies in a manner different than that of the original hologram. That is, in general, $$J_1[(C/\lambda_3)s] \neq J_1[(k/\lambda_3)J_1[(C/\lambda_2)s]]$$ as the wavelength $\lambda_3$ is varied. The wavelength $\lambda_2$ is fixed in the recording step of the copy. This effect is particularly noticeable when extremely non-linear portions of $J_1$ in the original hologram are used.

As discussed above, it is a usual goal in making a surface phase hologram to operate on a linear portion of the Bessel function curve. But in the present invention, the original hologram is intentionally made in an extremely non-linear portion of its characteristic curve so the signal recorded on the copy hologram is the original signal with a non-linear transfer function superimposed on it. Therefore, the optical signal reconstructed from the copy will not be a faithful reproduction of the original optical signal recorded.

Referring to FIG. 13, another first order Bessel function 81 is shown, along with a second order function 83. That is, the curve 81 shows the relative intensity of light diffracted into a first order beam, and the curve 83 that diffracted into a second order beam. The second order diffraction was not considered above, since it was assumed that the image was being viewed in only a first order diffracted beam. But the existence of a second order diffracted beam, in which a useful reconstruction of an image may also be present, can also be used to implement the present invention. A master hologram can be made with a particular geometry so second, and even higher, diffracted orders are easily viewable, as well as the first order. It will be noticed from FIG. 13 that the first order curve 81 has a zero diffraction efficiency at a groove depth d1, and the second order beam a zero diffraction efficiency at a different and deeper groove depth d2. For the same reasons stated above, therefore, this allows operation in those zero regions of the curves to produce the same result when rotating a surface relief hologram 85 (FIG. 14) about a horizontal axis. An observer alternately views an image 89 in a first order diffracted beam 91 and then in a second order diffracted beam 93. Alternative to operating in a region including zero diffraction efficiency, operation in extreme non-linear regions of the curves of FIG. 13 also brings about the desired results.

While a hologram made in accordance with the techniques discussed above with respect to FIGS. 13 and 14 cannot be copied by one of the methods of FIGS. 9 or 10 in a manner to faithfully mimic the patterns in the original hologram as the reconstructing wavelength is changed, it is possible to make a copy in a different way that closely mimics the patterns of the original at a single wavelength. This, however, is extremely difficult to accomplish, thus still providing a hologram with good security. For example, if all the orders are collected and used simultaneously as the object beam of the copy hologram, additional cross-product terms will result. This causes the relative intensities of the observed orders in the copy to be different than that of the original. A second way to make a copy includes individually recording, one at a time, all measurable orders diffracted from the hologram 85 onto a linear photosensitive copy detector. The laborious multiple holograms are recorded with low intensity in order to operate on a linear portion of the copy detector's characteristic curve and also to assure that extra terms of higher order are to be avoided. The resulting images reconstructed from the copy are thus very dim. Even so, specific changes in the original that occur with a single wavelength will not be faithfully copied, for the reasons discussed above with respect to FIGS. 4–11.

Although the various aspects of the present invention have been described with respect to its preferred embodiments, it will be understood that the invention is entitled to protection within the full scope of the appended claims. Specifically, it should be understood that the method is not limited to holographic diffraction gratings but can be used with much more complex holographic imagery.

It is claimed:

1. A diffraction device comprising a relief pattern in a surface of a substrate, said pattern including at least one region having grooves of a particular depth such that the intensity of light diffracted therefrom in a narrow visible wavelength range is substantially zero at all viewing angles throughout one diffractive order while the intensity of light diffracted therefrom in other wavelengths is significantly greater than zero at at least one viewing angle in the same diffractive order.

2. The diffraction device according to claim 1 wherein said surface relief diffraction pattern includes a hologram.

3. The diffraction pattern according to claim 1 wherein said surface relief diffraction pattern includes at least one other region adjacent to at least said one region that includes grooves of a particular depth such that the intensity of light diffracted in a wavelength other than said one wavelength is substantially zero, while the intensity of light diffracted therefrom in said one wavelength is significantly greater than zero.

4. A diffraction device according to claim 1 which additionally comprises a carrier to which the diffraction device is attached, said carrier including a device or information which is desired to be authenticated or secured.

5. The diffraction device according to claim 4 wherein said carrier is selected from the group of credit card, passport, identification card, driver's license, and certificate.

6. A diffraction device as in claim 1, wherein said surface relief pattern exists only on a single surface.

7. A diffraction device as in claim 6, wherein said diffraction device is reproducable by embossing from a master created therefrom.

8. In a hologram having a diffraction pattern resulting from interference between an object carrying wavefront and a coherent reference wavefront, said object wavefront having a particular intensity distribution thereacross according to the object characteristics, and said reference wavefront having substantially no intensity variations thereacross, the improvement wherein said diffraction pattern diffracts polychromatic light incident thereon into at least one diffracted wavefront that reconstructs therein an image of the object with at least a portion of said image having a property of both substantially zero diffractive efficiency for all viewing angles throughout one diffractive order in one narrow wavelength range and significant diffractive efficiency for at least one viewing angle in other wavelengths in the same diffractive order.

9. The hologram according to claim 8 wherein said diffraction pattern is additionally characterized in that a copy made therefrom in monochromatic light constructs said at least a portion of said image of said object without said property.

10. A hologram as in claim 8, wherein said diffraction pattern is a surface relief pattern that exists only on a single surface.

11. A hologram as in claim 10, wherein said diffraction pattern is reproducable by embossing from a master created therefrom.

12. In a method of making a hologram that includes the steps of forming a coherent object carrying wavefront, positioning a holographic recording photosensitive medium in the path of said wavefront, directing a reference wavefront coherent with said object wavefront onto said detector for interference with said object wavefront, and processing the detector to make a surface, the improvement comprising the steps of adjusting the intensity of the object and reference wavefronts, and controlling the processing of the holographic recording photosensitive medium, such that the resulting hologram has a surface relief pattern or grooves in first and second areas thereof that are each characterized by diffracting substantially no light at all viewing angles throughout one diffractive order in one wavelength and significant light into at least one viewing angle in the same diffractive order in other wavelengths.

13. A method of making a hologram as in claim 12, wherein said surface relief pattern exists only on a single surface.

14. A method of making a hologram as in claim 13, wherein the steps further comprise:
creating a master with said surface relief pattern; and
embossing the master on a thermoplastic material to create the hologram therefrom.

15. A carrier comprising an article or information which is desired to be authenticated or secured, and a diffraction pattern or hologram device attached thereto, said diffraction pattern or hologram device having been constructed from the interference of two coherent light beams and characterized by at least a portion thereof having a diffraction efficiency for one narrow range of visible light wavelengths that is substantially zero while having an efficiency that is significantly non-zero for other visible light wavelengths, whereby a copy of said diffraction pattern or hologram made with monochromatic light diffracted by said device will not reproduce the same diffraction efficiency variation at various wavelengths and thereby will be visually identifiable as a copy.

16. The combination of claim 15 wherein the light intensity differences of said diffraction pattern or hologram are contained in a single first order diffracted beam.

17. The combination of claim 15 wherein the light diffraction intensity differences of said diffraction pattern or hologram occur between different diffracted orders.

18. The combination of claim 15 wherein said carrier is selected from the group of credit card, passport, identification card, driver's license, and certificate.

19. A diffraction pattern or hologram device of a type constructed from the interference of two coherent light beams and especially adapted for attachment to genuine documents and things to authenticate them, comprising:
a first portion thereof having a diffraction efficiency that is substantially zero at a first visible light wavelength range and having an efficiency that is significantly non-zero for other visible light wavelengths,
a second portion thereof adjacent said first portion and having a diffraction efficiency that is substantially zero at a second visible light wavelength range that is different from said first visible light wavelength range and having an efficiency that is significantly non-zero for visible light wavelengths other than said second wavelength range,
said device being characterized by reconstructing in polychromatic light an image in a diffracted order that includes at least a spot that appears to move between said first and second portions as the device is rotated to view different colors of the diffraction, and
said device further being characterized in that a copy made of said diffraction pattern or hologram with monochromatic light diffracted by said device does not reproduce the same diffraction efficiency variation at various wavelengths and thus does not reconstruct the moving spot when viewed in polychromatic light, thereby enabling a non-genuine device to be visually detected.

20. A method of authenticating an article, comprising the steps of:
attaching to said article a diffraction pattern or hologram device that has been constructed in at least a portion thereof to have a substantially zero diffraction efficiency in a given range of visible wavelengths while having a significant non-zero diffraction efficiency in other visible wavelengths, and which is characterized by diffracting incident white light thereupon into at least one diffracted order, wherein said other visible wavelengths are spatially separated across said order and said given range of visible wavelengths is absent,
illuminating said diffraction pattern or hologram device with polychromatic light, thereby to diffract such incident light into said at least one diffracted order,
detecting the diffracted light by positioning a light detector in one of said diffracted orders, and
providing relative motion between said detector and said diffraction pattern or hologram device in a manner to detect the absence of said given range of visible wavelengths and the presence of said other visible wavelengths.

21. The method according to claim 20 wherein the detecting step comprises positioning a human eye in said at least one diffracted order as the detector.

22. The method according to claim 20 wherein said device has been so constructed only in a portion thereof.

23. A method of authenticating an article, comprising the steps of:

attaching to said article a diffraction pattern or hologram device that has been constructed in a first portion thereof to have a substantially zero diffraction efficiency in a first given range of visible wavelengths while having a significant non-zero diffraction efficiency in visible wavelengths other than said first range, and in a second portion thereof to have a substantially zero diffraction efficiency in a second given range of visible wavelengths while having a significant non-zero diffraction efficiency in visible wavelengths other than said second range, said first and second ranges being distinct, each of the first and second portions of said device further being characterized by diffracting incident white light thereupon into at least one diffracted order, the diffracted order from said first portion being absent of said first range of wavelengths and the diffracted order from said second portion being absent of said second range of wavelengths, illuminating said device with polychromatic light, thereby to diffract such incident light by both first and second portions of said device, detecting the diffracted light by positioning a light detector in one of said diffracted orders, and providing relative motion between said detector and said device in a manner to detect the absence of said first and second given ranges of visible wavelengths of light diffracted from each of said first and second regions of said device, respectively.

24. The method according to claim 23 wherein the detecting step comprises positioning a human eye in said at least one diffracted order.

25. A copy protected device comprising:
a diffraction pattern which diffracts an incident polychromatic light into bundles of light beams of different, angularly separated diffractive orders, each said bundle of beams composed of angular separated beams, each said beam corresponding to a color component of the incident polychromatic light; and means provided as at least a portion of said diffraction pattern for substantially nulling the intensity of at least one of said diffracted beams corresponding to one color component of a first or higher order bundle of beams, whereby a substantial null is observable along the angle corresponding to said one color component, and not so for other angles corresponding to other color components, whereas a copy of said diffraction pattern made in monochromatic light will not have the same observable diffractive attributes.

26. The diffraction device according to claim 25 wherein the recorded diffraction pattern is additionally characterized by an intensity distribution with at least one moving dark spot as said device is tilted and wherein said diffraction pattern is further characterized by said copy diffraction device having at least one dark spot which remains fixed as the copy is tilted in white light.

27. The diffraction device according to claim 25 and additionally including a carrier to which it is attached, said carrier containing information to be authenticated.

28. The diffraction device according to claim 25 wherein said recorded diffraction pattern includes a hologram.

29. A copy protected device as in claim 25, wherein said diffraction pattern comprises a relief pattern or grooves in a surface of a substrate, and said nulling means for said first or higher order beam of said color component is effected by adjusting the groove depth.

30. A copy protected device as in claim 29, wherein said surface relief pattern exists only on a single surface.

31. A copy protected device as in claim 30, wherein said surface relief pattern is reproducable by embossing from a master created therefrom.

* * * * *

UNITED STATES PATENT AND TRADEMARK OFFICE
CERTIFICATE OF CORRECTION

PATENT NO. : 4,832,445
DATED : May 23, 1989
INVENTOR(S) : Haines et al.

It is certified that error appears in the above-identified patent and that said Letters Patent is hereby corrected as shown below:

Col. 9, lines 16-17, "constructs" should be --reconstructs--.

Signed and Sealed this

Sixteenth Day of January, 1990

Attest:

JEFFREY M. SAMUELS

Attesting Officer     Acting Commissioner of Patents and Trademarks